Oct. 15, 1940.

B. H. CARROLL 2,218,230

PHOTOGRAPHIC EMULSION

Filed Nov. 17, 1939

Fig. 1

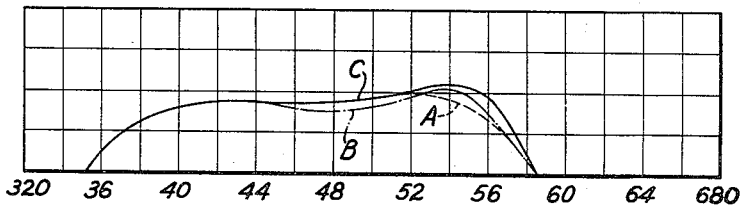

A = 2-(4-piperidyl-$\Delta^{1,3}$-butadienyl)-β-naphthothiazole ethiodide.
B = 2,1'-diethyl-6'-methyl-3,4-benzothia-2'-cyanine iodide.
C = Mixture of these two dyes.

Fig. 2

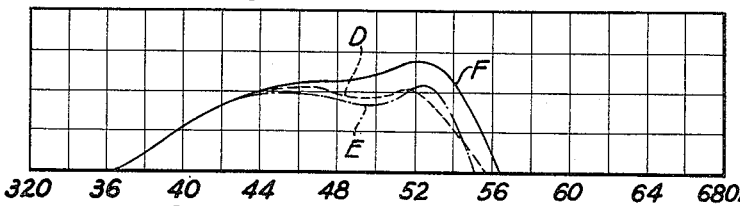

D = 1-(4-piperidyl-$\Delta^{1,3}$-butadienyl)-benzoselenazole ethiodide.
E = 2,1'-diethyl-4-chlorothia-2'-cyanine iodide.
F = Mixture of these two dyes.

Fig. 3

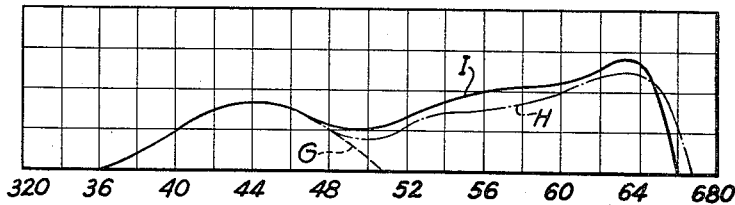

G = 1-[β-(1-piperidyl)-vinyl]-β-naphthothiazole ethiodide.
H = 2,2',8-triethyl-4,4'-dichlorothiacarbocyanine bromide.
I = Mixture of these two dyes.

Fig. 4

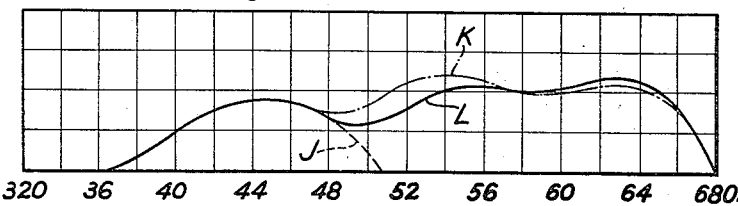

J = 1-[β-(1-piperidyl)-vinyl]-β-naphthothiazole ethiodide.
K = 2,2'-diethyl-8-methyl-3,4,3',4'-dibenzothiacarbocyanine iodide.
L = Mixture of these two dyes.

BURT H. CARROLL
INVENTOR

BY *N. M. Perrins*
*Daniel J. Mayne*
ATTORNEYS

Patented Oct. 15, 1940

2,218,230

UNITED STATES PATENT OFFICE 2,218,230

PHOTOGRAPHIC EMULSION

Burt H. Carroll, Rochester, N. Y., assignor to Eastman Kodak Company, Rochester, N. Y., a corporation of New Jersey Application November 17, 1939, Serial No. 304,995
In Great Britain February 20, 1939

13 Claims. (Cl. 95—7)

This invention relates to photographic emulsions and more particularly to sensitized photographic emulsions of the silver halide type.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

More recently, it has been found that the sensitization produced in an emulsion by certain cyanine dyes can be increased by incorporating, in the sensitized emulsion, certain other cyanine dyes. Inasmuch as conditions in the emulsion, i. e. the silver ion and/or the hydrogen ion concentration, undergo little or no change in such a method, the phenomenon has been called "supersensitization." Certain supersensitizing combinations of cyanine dyes and of cyanine dyes with styryl salts have been described in United States Patents 2,075,046; 2,075,047 and 2,075,048, each dated March 30, 1937.

I have now found a new means of altering the sensitivity produced in emulsions by means of certain cyanine dyes. Inasmuch as the conditions in the emulsions, i. e. the hydrogen ion and/or the silver ion concentration, undergo little or no change in my new method, I shall designite my new method as a kind of supersensitization. However, my new method is not to be confused with that described in the foregoing patents, because instead of employing combinations of cyanine dyes or of a cyanine dye with a styryl salt, I employ a combination of certain hemicyanine with certain cyanine dyes. My new emulsions possess greater sensitivity, particularly in the green, than those of the aforesaid patents and are more free from fog than the emulsions sensitized with supersensitizing combinations of cyanine dyes and styryl salts. Furthermore, by means of hemicyanine dyes, I have been able to supersensitize a wider variety of cyanine dyes than is possible by means of styryl salts.

It is an object of my invention, therefore, to provide supersensitized photographic emulsions. A further object is to provide a process for preparing supersensitized emulsions. Other objects will appear hereinafter.

I have found that hemicyanine dyes falling with the sub-classes $\alpha$-hemicarbocyanine dyes and $\alpha$-hemidicarbocyanine dyes supersensitize 2'-cyanine (i. e. pseudocyanine) dyes and $\alpha,\alpha'$-carbocyanine dyes. While there is more than one manner of naming and formulating the hemicyanine dyes and cyanine dyes which I employ in practicing my invention, it is believed that the following names, formulas, and systems of numbering are in accordance with those employed during the development of the art to its present stage.

The $\alpha$-hemicarbocyanine dyes and $\alpha$-hemidicarbocyanine dyes can be represented by the following general formula:

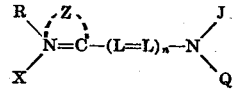

wherein R represents an alkyl group, such as methyl, ethyl, isoamyl, $\beta$-hydroxyethyl or benzyl for example, X represents an acid radical, such as halide, p-toluenesulfonate or perchlorate for example, L represents a methenyl group, such as CH or substituted methenyl, $n$ represents a positive integer of from one to two, J represents hydrogen or an alkyl group while Q represents an alkyl group or J and Q together represent the non-metallic atoms necessary to complete an organic basic cyclic nucleus other than a pyrrol nucleus and Z represents the non-metallic atoms necessary to complete an organic heterocyclic nucleus.

In general, $\alpha$-hemidicarbocyanine dyes (where $n$ in the above formula represents two) containing benzothiazole, $\beta$-naphthothiazole, benzoselenazole, $\alpha$-naphthoxazole, $\beta$-naphthoxazole or benzoxazole nuclei (where Z in the above formula represents the non-metallic atoms necessary to complete such nuclei) are strong supersensitizers of the following kinds of pseudocyanine dyes, viz. 2,2'-cyanine dyes, thia-2'-cyanine dyes, benzothia-2'-cyanine dyes and selena-2'-cyanine dyes. The hemidicarbocyanine dyes where, in the above formula, each of the J and Q groups are alkyl groups of the formula $C_nH_{2n+1}$ wherein $n$ represents a positive integer of from 1 to 4 are preferred. Of such dyes, those wherein the alkyl groups are ethyl groups are especially outstanding. Another preferred group of hemidicarbocyanine dyes are those where, in the above formula, J and Q together represent the non-metallic atoms necessary to complete a piperidyl nucleus.

In general, the α-hemicarbocyanine dyes (where n in the above formula represents one) are much weaker supersensitizers of pseudocyanine dyes than the aforesaid α-hemidicarbocyanine dyes. However, the hemicarbocyanine dyes are especially useful supersensitizers of 8-alkylthia and 8-alkyldibenzothiacarbocyanine dyes. The hemicarbocyanine dyes containing benzothiazole, β-naphthothiazole or benzoselenazole, on the one hand, and piperidyl or morpholyl nuclei on the other, are especially useful supersensitizers of the aforesaid carbocyanine dyes.

Hemicarbocyanine and hemidicarbocyanine dyes are described in United States Patent 2,166,-736, dated July 18, 1939. The following general formulas of some of the α-hemicarbocyanine and α-hemidicarbocyanine dyes which are especially useful in practicing my invention will serve to set forth the nature of such dyes with more particularity:

The 1-(4-dialkylamino-Δ¹,³-butadienyl)-benzothiazole alkyl quaternary salts of the formula:

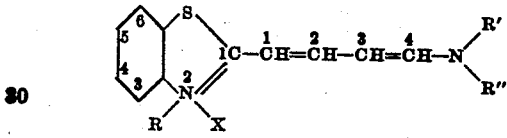

The 2-(4-dialkylamino-Δ¹,³-butadienyl)-β-naphthothiazole alkyl quaternary salts of the formula:

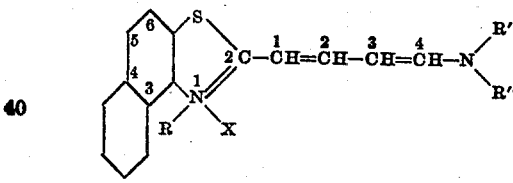

The 1-(4-dialkylamino-Δ¹,³-butadienyl)-benzoselenazole alkyl quaternary salts of the formula:

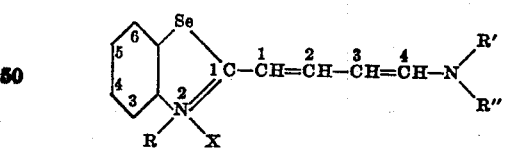

The 1-(4-dialkylamino-Δ¹,³-butadienyl)-benzoxazole alkyl quaternary salts of the formula:

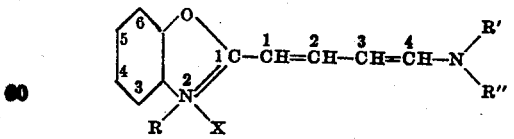

The μ-(4-dialkylamino-Δ¹,³-butadienyl)-naphthoxazole alkyl quaternary salts of the formula:

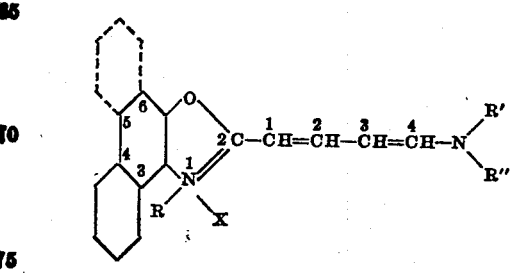

The 1-[4-(1-piperidyl)-Δ¹,³-butadienyl]-benzoxazole, benzothiazole or benzoselenazole alkyl quaternary salts of the formula:

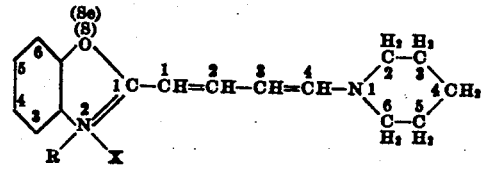

The 2-[4-(1-piperidyl)-Δ¹,³-butadienyl]-naphthothiazole alkyl quaternary salts of the formula:

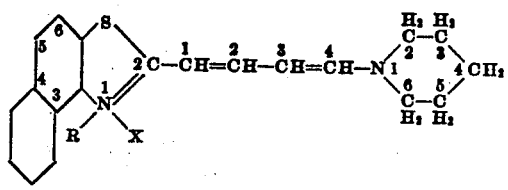

The μ-[4-(1-piperidyl)-Δ¹,³-butadienyl]-naphthoxazole alkyl quaternary salts of the formula:

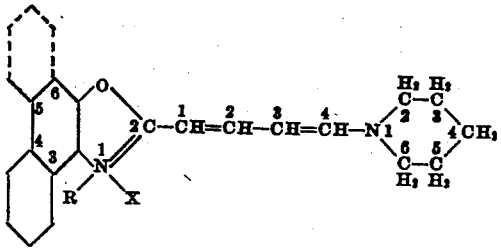

The 1-[β-(1-piperidyl)-vinyl]-benzothiazole and benzoselenazole alkyl quaternary salts of the formula:

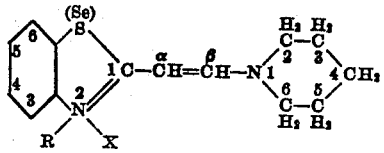

The 2-[β-(1-piperidyl)-vinyl]-β-naphthothiazole alkyl quaternary salts of the formula:

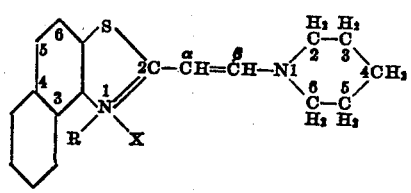

The 1-[β-(4-morpholyl)-vinyl]-benzothiazole and benzoselenazole alkyl quaternary salts of the formula:

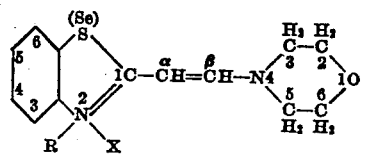

The 2-[β-(4-morpholyl)-vinyl]-β-naphthothiazole alkyl quaternary salts of the formula:

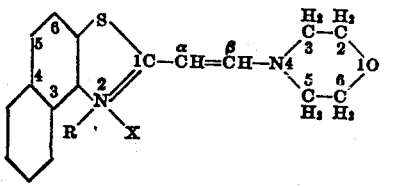

In the above twelve formulas, R, R' and R'' represent alkyl groups and X represents an acid radical or anion. I have found it convenient to employ the dye-halides (where X represents halide) in practicing my invention. However, other dye-salts can be used. I have found it advantageous to employ dyes where R, R' and R'' represent an alkyl group of the formula $C_nH_{2n+1}$ wherein $n$ represents a positive integer of form one to four. Dyes wherein R, R' and R'' represent ethyl groups are especially advantageously employed. The nuclei of the dyes can carry simple substituents which do not interfere with sensitizing properties, such, for example, as alkyl, alkoxy or chloro groups.

The pseudocyanine dyes are a well known group of dyes and the preparation of a number of the known pseudocyanine dyes has been reviewed by Brooker and Keyes in the Journal of the American Chemical Society, vol. 57, pages 2488–2491 (1935). Among the pseudocyanine dyes especially useful in practicing our invention are the following:

The 2,2'-cyanine dyes which have the following formula:

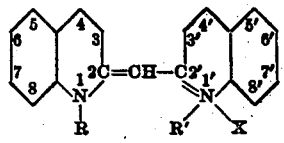

The thia-2'-cyanine dyes which have the following formula:

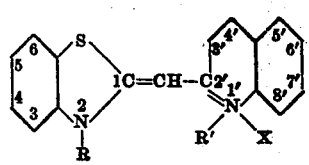

The 3,4-benzothia-2'-cyanine dyes which have the following formula:

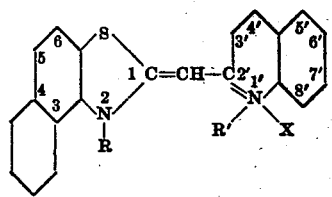

The selena-2'-cyanine dye which have the following formula:

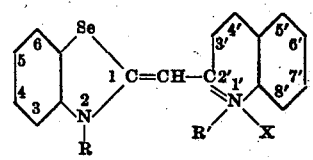

In the above formulas of pseudocyanine dyes, R and R' represent alkyl groups and X represents an acid radical or anion. I have found it convenient to employ the dye-halides (where X represents halide) in practicing my invention. However, other dye-salts can be used. I have found it advantageous to employ dyes where R and R' represent an alkyl group of the formula $C_nH_{2n+1}$ wherein $n$ represents a positive integer of from one to four. Dyes wherein R and R' represent ethyl groups are especially advantageously employed. The nuclei of the dyes can carry simple substituents which do not interfere with sensitizing properties, such, for example, as alkyl, alkoxy or chloro groups.

The $\alpha,\alpha'$-carbocyanine dyes are a well known group of dyes and can be represented by the following general formula:

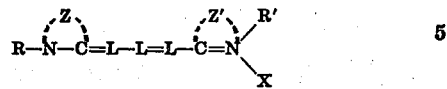

wherein R and R' represent alkyl groups, L represents a methenyl group, X represents an acid radical and Z and Z' each represent the non-metallic atoms necessary to complete an organic heterocyclic nucleus, e. g. a quinoline nucleus or a benzothiazole nucleus.

Among the $\alpha,\alpha'$-carbocyanine dyes especially useful in practicing our invention are the following:

The 2,2'-carbocyanine dye which have the following formula:

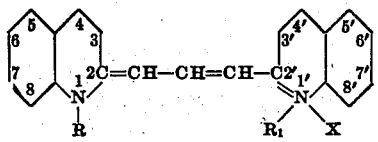

The 8-alkylthiacarbocyanine dyes which have the following formula:

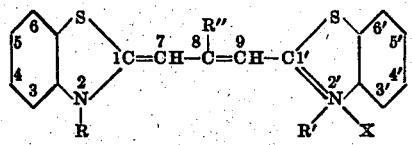

The 8-alkyl-3,4,3',4'-dibenzothiacarbocyanine dyes which have the following formula:

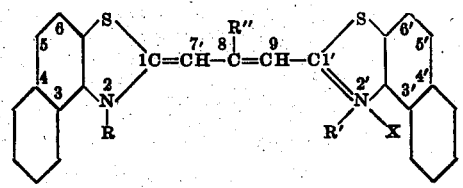

In the above formulas of carbocyanine dyes, R, R' and R'' represent alkyl groups and X represents an acid radical. I have found it convenient to employ the dye-halides (where X represents halide) in practicing my invention. However, other dye salts can be used. I have found it advantageous to employ dyes where R and R' represent an alkyl group of the formula $C_nH_{2n+1}$ wherein $n$ represents a positive integer of from one to four and where R'' represents an alkyl group with not more than two carbon atoms, i. e. methyl or ethyl. The nuclei of the dyes can carry simple substituents which do not interfere with sensitizing properties, such, for example, an alkyl, alkoxy or chloro groups.

According to my invention, I incorporate one or more sensitizing pseudocyanine (2'-cyanine) dyes and/or one or more $\alpha,\alpha'$-carbocyanine dyes, together with one or more $\alpha$-hemicarbocyanine and/or $\alpha$-hemidicarbocyanine dyes in a photographic emulsion. My invention is particularly directed to the ordinarily employed gelatino-silver-halide emulsions. However, my supersensitizing combinations can be employed in silver halide emulsions in which the carrier is other than gelatin, for example, a resinous substance or cellulosic derivative which has substantially no deleterious effect on the light-sensitive materials. As silver halide emulsions, I include such emulsions as are commonly employed in the art, but more particularly silver chloride and silver bromide emulsions. By way of illustration, most of the herein described emulsions were prepared employing an ordinary gelatino-silver-bromide emulsion (containing a small amount of silver iodide) of ordinary concentration (approximately 40 grams of silver halide per liter of emulsion).

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain cases, that the sensitization produced by the supersensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of my supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

Ordinarily the optimum or near optimum concentration of the sensitizing dyes which I employ in practicing my invention, is of the order of 5 to 20 mg. of dye per liter of emulsions. In preparing gelatino-silver-bromide (or bromiodide) emulsions (containing about 40 grams of silver halide per liter) sensitized with my supersensitizing combinations, I have found that the concentrations of the individual dyes are ordinarily advantageously within the range, 5 to 20 mg. of the dye per liter of emulsion. With extremely fine grain emulsions (which includes most of the customarily employed gelatino-silver-chloride emulsions), the ratio of concentration of sensitizing dye to the concentration of silver halide in the emulsion is advantageosuly larger than in the coarser grain emulsions, where smaller amounts of sensitizing dye usually gives optimum sensitization.

Generally speaking, the ratio of concentration of a $\alpha$-hemicarbo- or dicarbocyanine dye to pseudocyanine dye or $\alpha,\alpha'$-carbocyanine dye can vary rather widely in my new combinations, e. g. from 5:1 to 1:5, in many cases.

The methods of incorporating sensitizing dyes in emulsions are well known to those skilled in the art. In practicing my invention, the sensitizing dyes can be incorporated in the emulsions separately or together. It is convenient to add the dyes separately in the form of solutions in appropriate solvents. Methanol and ethanol, especially the former, have proven satisfactory as solvents for the dyes which I employ. The dyes are advantageously incorporated in the finished, washed emulsions and should be uniformly distributed throughout the emulsions. The following procedure is satisfactory: Stock solutions of the sensitizing dyes desired are prepared by dissolving the dyes in methyl or ethyl alcohol. Then, to one liter of a flowable gelatino-silver-halide emulsion, the desired amounts of the stock solution of one of the dyes (diluted somewhat with water, if desired) is slowly added, while stirring the emulsion. Stirring is continued until the dye is thoroughly incorporated in the emulsion. Then the desired amount of the stock solution of the second dye (diluted somewhat with water, if desired) is slowly added to the emulsion, while stirring. Stirring is continued until the second dye is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the individual sensitizing dyes actually incorporated in the emulsion will vary somewhat from dye to dye, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly my invention is directed to any emulsion containing a combination of the aforesaid sensitizing dyes whereby a supersensitizing effect is obtained.

The following combinations of dyes are illustrative of combinations which can advantageously be employed in practicing my invention. These illustrations are not intended to be limiting:

A. 1,1'-diethyl-2,2'-cyanine iodide with one or more of the following $\alpha$-hemidicarbocyanine dyes:

1-(4 - piperidyl - $\Delta^{1,3}$-butadienyl)-benzothiazole ethiodide.
1-(4-diethylamino - $\Delta^{1,3}$-butadienyl)-benzothiazole ethiodide.
2-(4-piperidyl - $\Delta^{1,3}$-butadienyl)-$\beta$-naphthothiazole ethiodide.
1-(4-piperidyl - $\Delta^{1,3}$ - butadienyl)-benzoselenazole ethiodide.
1-(4-piperidyl - $\Delta^{1,3}$-butadienyl) - $\alpha$-naphthoxazole ethiodide.

B. 2-(4-piperidyl-$\Delta^{1,3}$-butadienyl)-$\beta$-naphthothiazole ethiodide with one or more of the following pseudocyanine dyes:

2,1'-diethyl-4-chlorothia-2'-cyanine iodide.
2,1'-diethyl-6,6'-dimethyl-2,2'-cyanine iodide.
2,1'-diethyl-6'-methyl - 3,4-benzothia-2'-cyanine iodide.
2,1'-diethyl-3,4-benzothia-2'-cyanine iodide.
2,1'-diethylselena-2'-cyanine iodide.
2,1'-diethyl-6'-methoxythia-2'- cyanine iodide.

C. 2-[$\beta$-(1-piperidyl)-vinyl]-naphtho-thiazole ethiodide with one or more of the following $\alpha,\alpha'$- carbocyanine dyes:

2,2'-dimethyl-8-ethylthiacarbocyanine bromide.
2,2',8 - triethyl-4,4' - dichlorothia - carbocyanine chloride.

D. 2,2',8 - triethyl - 4,4'-dichlorothiacarbocyanine bromide with one or more of the following α-hemicarbocyanine dyes:

1-[β-(1-piperidyl)-vinyl] - benzothiazole ethiodide.

1-[β-(1-piperidyl)-vinyl]-benzothiazole methochloride.

1-[β-(4-morpholyl)-vinyl]-benzothiazole ethiodide.

The accompanying drawing illustrates the supersensitizing effect obtained with four of my new combinations in silver bromiodide emulsions. Each figure of the drawing is a diagrammatic reproduction of three spectrograms. In each figure the sensitivity of the emulsion containing the α-hemicarbo- or dicarbocyanine dye is represented by the dotted-line curve, the sensitivity of the same emulsion containing the pseudocyanine or carbocyanine dye is represented by the dot and dash line curve, and the sensitivity of the same emulsion containing the combination of the dyes by the solid line curve.

In Fig. 1, curve A represents the sensitivity of an ordinary gelatino-silver-bromiodide emulsion containing 2-(4-piperidyl-$\Delta^{1,3}$-butadienyl) - β - naphthothiazole ethiodide (in a concentration of 20 mg. per liter of emulsion), curve B represents the sensitivity of the same emulsion containing 2,1'-diethyl-6'-methyl-3,4-benzothia-2' - cyanine iodide (in a concentration of 20 mg. per liter of emulsion) and curve C represents the sensitivity of the same emulsion containing 2-(4-piperidyl-$\Delta^{1,3}$-butadienyl)-β-naphthothiazole ethiodide (in a concentration of 10 mg. per liter of emulsion) together with 2,1'-diethyl-6'-methyl-3,4-benzothia-2'-cyanine iodide (in a concentration of 10 mg. per liter of emulsion). The supersensitizing effect is apparent from the curves. The emulsion represented by curve A had a speed of 9.3 (Wratten No. 12 filter) and a gamma of 1.82. The emulsion represented by curve B had a speed of 8.3 (Wratten No. 12 filter) and a gamma of 1.70. The emulsion represented by curve C had a speed of 14 (Wratten No. 12 filter) and a gamma of 1.85.

In Fig. 2, curve D represents the sensitivity of an ordinary gelatino-silver-bromiodide emulsion containing 1-(4'-piperidyl) - $\Delta^{1,3}$ - butadienyl)-benzoselenazole ethiodide (in a concentration of 10 mg. per liter of emulsion), curve E represents the sensitivity of the same emulsion containing 2,1'-diethyl-4-chlorothia-2'-cyanine iodide (in a concentration of 10 mg. per liter of emulsion) and curve F represents the sensitivity of the same emulsion containing 1-(4 - piperidyl - $\Delta^{1,3}$-butadienyl)-benzoselenazole ethiodide (in a concentration of 10 mg. per liter of emulsion) together with 2,1'-diethyl-4-chlorothia-2'-cyanine iodide (in a concentration of 10 mg. per liter of emulsion.) The supersensitizing effect is apparent from the curves. The emulsion represented by curve D had a speed (Wratten No. 12 filter) of 27.5 and a gamma of 1.90, that represented by curve E, a speed of 23.4 (Wratten No. 12 filter) and a gamma of 1.86, while that represented by curve F had a speed of 33.1 (Wratten No. 12 filter) and a gamma of 1.66.

In Fig. 3, curve G represents the sensitivity of an ordinary gelatino-silver-bromiodide emulsion containing 1-[β-(1-piperidyl) vinyl]-β-naphthothiazole ethiodide (in a concentration of 20 mg. per liter of emulsion), curve H represents the sensitivity of the same emulsion containing 2,2',8-triethyl-4,4'-dichlorothiacarbocyanine bromide (in a concentration of 10 mg. per liter of emulsion), and curve I represents the sensitivity of the same emulsion containing 1-[β-(1-piperidyl)-vinyl]-β-naphthothiazole (in a concentration of 20 mg. per liter of emulsion) together with 2,2',8-triethyl-4,4'-dichlorothiacarbocyanine bromide (in a concentration of 10 mg. per liter of emulsion). The supersensitizing effect is apparent from the curves. The emulsion represented by curve G had a speed approximately the same as the emulsion without 1-[β-(1-piperidyl)-vinyl]-β-naphthothiazole ethiodide, since the ethiodide confers no sensitivity on this type of emulsion. The emulsion represented by curve H had a speed of 18.2 (Wratten No. 25 filter) and a gamma of 1.48, while the emulsion represented by curve I had a speed of 27.5 (Wratten No. 25 filter) and a gamma of 1.31.

In Fig. 4, curve J represents the sensitivity of an ordinary gelatino-silver-bromiodide emulsion containing 1-[β-(1-piperidyl) vinyl]-β-naphthothiazole ethiodide (in a concentration of 20 mg. per liter of emulsion), curve K represents the sensitivity of the same emulsion containing 2,2'-diethyl - 8 - methyl - 3,4,3',4' - dibenzothiacarbocyanine chloride (in a concentration of 10 mg. per liter of emulsion), and curve L represents the sensitivity of the same emulsion containing 1-[β-(1-piperidyl) vinyl]-β-naphthothiazole ethiodide (in a concentration of 20 mg. per liter of emulsion) together with 2,2'-dimethyl-8-ethyl-3,4,3',4'-dibenzothiacarbocyanine iodide (in a concentration of 10 mg. per liter of emulsion). The supersensitizing effect is apparent from the curves.

Still further illustrations could be given, but the foregoing are believed to demonstrate the supersensitizing effect that can be attained according to my invention.

What I claim as my invention and desire to be secured by Letters Patent of the United States is:

1. A photographic silver halide emulsion containing a supersensitizing combination of at least one sensitizing dye selected from the group consisting of pseudocyanine and α,α'-carbocyanine dyes together with at least one sensitizing dye selected from the group of dyes characterized by the following formula:

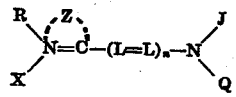

wherein L represents a methenyl group, n represents a positive integer of from one to two, J represents a group selected from the group consisting of hydrogen and alkyl groups while Q represents an alkyl group and J and Q together represent the non-metallic atoms necessary to complete an organic basic nucleus other than a pyrrol nucleus, R represents an alkyl group, X represents an acid radical and Z represents the non-metallic atoms necessary to complete an organic heterocyclic nucleus.

2. A photographic gelatino-silver-halide emulsion containing a supersensitizing combination of at least one sensitizing dye selected from the group consisting of pseudocyanine and α,α'-carbocyanine dyes together with at least one sensitizing dye selected from the group of dyes characterized by the following formula:

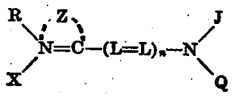

wherein L represents a methenyl group, $n$ represents a positive integer of from one to two, J represents a group selected from the group consisting of hydrogen and alkyl groups while Q represents an alkyl group and J and Q together represent the non-metallic atoms necessary to complete an organic basic nucleus other than a pyrrol nucleus, R represents an alkyl group, X represents an acid radical and Z represents the non-metallic atoms necessary to complete an organic heterocyclic nucleus.

3. A photographic gelatino-silver-halide emulsion containing a supersensitizing combination of at least one sensitizing pseudocyanine dye together with at least one sensitizing dye selected from the group of dyes characterized by the following formula:

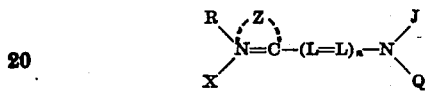

wherein L represents a methenyl group, $n$ represents a positive integer of from one to two, J represents a group selected from the group consisting of hydrogen and alkyl groups while Q represents an alkyl group and J and Q together represent the non-metallic atoms necessary to complete an organic basic nucleus other than a pyrrol nucleus, R represents an alkyl group, X represents an acid radical and Z represents the nonmetallic atoms necessary to complete an organic heterocyclic nucleus.

4. A photographic gelatino-silver-halide emulsion containing a supersensitizing combination of at least one sensitizing $\alpha,\alpha'$-carbocyanine dye together with at least one sensitizing dye selected from the group of dyes characterized by the following formula:

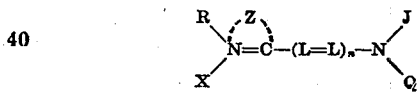

wherein L represents a methenyl group, $n$ represents a positive integer of from one to two, J represents a group selected from the group consisting of hydrogen and alkyl groups while Q represents an alkyl group and J and Q together represent the non-metallic atoms necessary to complete an organic basic nucleus other than a pyrrol nucleus, R represents an alkyl group, X represents an acid radical and Z represents the non-metallic atoms necessary to complete an organic heterocyclic nucleus.

5. A photographic gelatino-silver-halide emulsion containing a supersensitizing combination of at least one sensitizing pseudocyanine dye selected from the group consisting of 1,1'-dialkyl-2,2'-cyanine dyes, 2,1'-dialkylthia-2'-cyanine dyes, 2,1'-dialkyl-3,4-benzothia-2'-cyanine dyes and 2,1'-dialkylselena-2'-cyanine dyes, together with at least one sensitizing hemidicarbocyanine dye selected from the group of hemidicarbocyanine dyes characterized by the following formula:

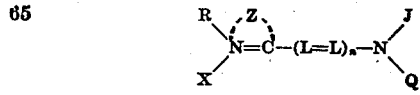

wherein L represents a methenyl group, $n$ represents the integer two, J and Q each represent alkyl groups and J and Q together represent the non-metallic atoms necessary to complete a piperidyl nucleus, R represents an alkyl group, X represents an acid radical and Z represents the non-metallic atoms necessary to complete an organic heterocyclic nucleus selected from the group consisting of benzoxazole, benzothiazole, benzoselenazole, $\beta$-naphthothiazole, $\beta$-naphthoxazole and $\alpha$-naphthoxazole nuclei.

6. A photographic gelatino-silver-halide emulsion containing a supersensitizing combination of at least one sensitizing pseudocyanine dye selected from the group consisting of 1,1'-dialkyl-2,2'-cyanine dyes, 2,1'-dialkylthia-2'-cyanine dyes, 2,1'-dialkyl-3,4-benzothia-2'-cyanine dyes and 2,1'-dialkylselena-2'-cyanine dyes in which the 1-, 1'- and 2-alkyl groups are alkyl groups of the formula $C_nH_{2n+1}$ wherein $n$ represents a positive integer of from one to four, together with at least one sensitizing hemidicarbocyanine dye selected from the group of hemidicarbocyanine dyes characterized by the following formula:

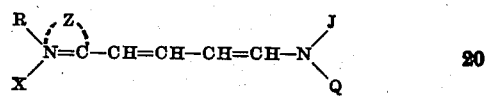

wherein J and Q each represent alkyl groups of the formula $C_nH_{2n+1}$ wherein $n$ represent a positive integer of from one to four, and J and Q together represent the non-metallic atoms necessary to complete a piperidyl nucleus, R represents an alkyl group of the formula $C_nH_{2n+1}$ wherein $n$ represents a positive integer of from one to four, X represents an acid radical and Z represents the non-metallic atoms necessary to complete an organic heterocyclic nucleus selected from the group consisting of benzoxazole, benzothiazole, benzoselenazole, $\beta$-naphthothiazole, $\beta$-naphthoxazole and $\alpha$-naphthoxazole nuclei.

7. A photographic gelatino-silver-halide emulsion containing a supersensitizing combination of at least one sensitizing pseudocyanine dye selected from the group consisting of 1,1'-diethyl-2,2'-cyanine dyes, 2,1'-diethylthia-2'-cyanine dyes, 2,1'-diethyl-3,4-benzothia-2-cyanine dyes and 2,1'-diethylselena-2'-cyanine dyes together with at least one sensitizing hemidicarbocyanine dye selected from the group of hemidicarbocyanine dyes characterized by the following formula:

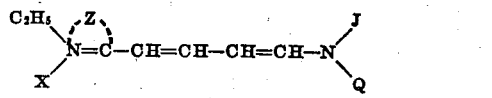

wherein J and Q each represent ethyl groups, and J and Q together represent the non-metallic atoms necessary to complete a piperidyl nucleus, X represents an acid radical and Z represents the nonmetallic atoms necessary to complete an organic heterocyclic nucleus selected from the group consisting of benzoxazole, benzothiazole, benzoselenazole, $\beta$-naphthothiazole, $\beta$-naphthoxazole and $\alpha$-naphthoxazole nucleus.

8. A photographic gelatino-silver-halide emulsions containing a supersensitizing combination of a 2,1'-diethyl-3,4-benzothia-2'-cyanine dye, together with a 2-(4-piperdidyl-$\Delta^{1,3}$-butadienyl)-$\beta$-naphthothiazole ethiodide.

9. A photographic gelatino-silver-halide emulsion containing a supersensitizing combination of a 2,1'-diethyl-4-chlorothia-2'-cyanine dye together with 2-(4-piperidyl-$\Delta^{1,3}$-butadienyl)-$\beta$-naphthothiazole ethiodide.

10. A photographic gelatino-silver-halide emulsion containing a supersensitizing combination of at least one sensitizing $\alpha,\alpha'$-carbocyanine dye selected from the group consisting of 1,1'-dialkyl-2,2'-carbocyanine dyes, 2,2'-dialkyl-8-alkylthiacarbocyanine dyes and 2,2'-dialkyl-8-alkyl-3,4,3',4'-dibenzothiacorbocyanine dyes, together with at least one sensitizing hemicarbocyanine dye selected from the group of hemicarbocyanine dyes characterized by the following formula:

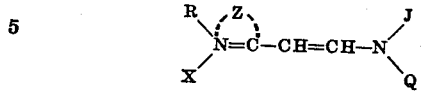

wherein J and Q together represent the non-metallic atoms necessary to complete an organic heterocyclic nucleus selected from the group consisting of piperidyl and morpholyl nuclei, R represents an alkyl group, X represents an acid radical and Z represents the non-metallic atoms necessary to complete a heterocyclic nucleus selected from the group consisting of benzothiazole, benzoselenazole and β-naphthothiazole nuclei.

11. A photographic gelatino-silver-halide emulsion containing a supersensitizing combination of at least one sensitizing α,α'-carbocyanine dye selected from the group consisting of 1,1'-dialkyl-2,2'-carbocyanine dyes, 2,2'-dialkyl-8-alkylthiacarbocyanine dyes and 2,2'-dialkyl-8-alkyl-3,4,3',4'-dibenzothiacarbocyanine dyes in which the 1-, 1'-, 2- and 2'-alkyl groups are alkyl groups of the formula $C_nH_{2n+1}$ wherein $n$ represents a positive integer of from one to four and in which the 8-alkyl groups are alkyl groups of the formula $C_nH_{2n+1}$ wherein $n$ represents a positive integer of from one to two, together with at least one sensitizing hemicarbocyanine dye selected from the group of hemicarbocyanine dyes characterized by the following formula:

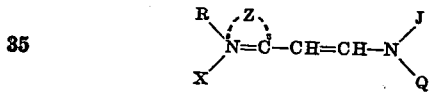

wherein J and Q together represents the non-metallic atoms necessary to complete an organic heterocyclic nucleus selected from the group consisting of piperidyl and morpholyl nuclei, R represents an alkyl group having the formula $C_nH_{2n+1}$ wherein $n$ represents a positive integer of from one to four, X represents an acid radical and Z represents the non-metallic atoms necessary to complete a heterocyclic nucleus selected from the group consisting of benzothiazole, benzoselenazole and β-naphthothiazole nuclei.

12. A photographic gelatino-silver-halide emulsion containing a supersensitizing combination of at least one sensitizing α,α'-carbocyanine dye selected from the group consisting of 1,1'-diethyl-2,2'-carbocyanine dyes, 2,2'-diethyl-8-alkyl-thiacarbocyanine dyes and 2,2'-diethyl-8-alkyl-3,4,3',4'-dibenzothiacarbocyanine dyes in which each of the 8-alkyl groups is an alkyl group of the formula $C_nH_{2n+1}$ wherein $n$ represents a positive integer of from one to two, together with at least one sensitizing hemicarbocyanine dye selected from the group of hemicarbocyanine dyes characterized by the following formula:

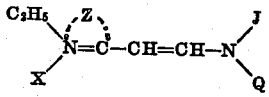

wherein J and Q together represents the non-metallic atoms necessary to complete a nucleus selected from the group consisting of piperidyl and morpholyl nuclei, X represents an acid radical and Z represents the non-metallic atoms necessary to complete an organic heterocyclic nucleus selected from the group consisting of benzothiazole, benzoselenazole and β-naphthothiazole nuclei.

13. A photographic gelatino-silver-halide emulsion containing a supersensitizing combination of at least one sensitizing 2,2',8-triethyl-4,4'-dichlorothiacarbocyanine dye together with at least one 1-[β-(piperidyl)-vinyl]-β-naphthothiazole ethiodide.

BURT H. CARROLL.